United States Patent
Illedits et al.

(10) Patent No.: US 10,150,650 B2
(45) Date of Patent: Dec. 11, 2018

(54) METHOD FOR INSTALLING A SUPPORT STRUCTURE FOR A PASSENGER TRANSPORT SYSTEM IN A CONSTRUCTION

(71) Applicant: INVENTIO AG, Hergiswil (CH)

(72) Inventors: Thomas Illedits, Neufeld an der Leitha (AT); Christoph Makovec, Wiener Neustadt (AT); David Krampl, Vienna (AT); Robert Schulz, Vienna (AT); Michael Matheisl, Vösendorf (AT); Uwe Hauer, Nienburg (DE)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 15/764,241

(22) PCT Filed: Sep. 22, 2016

(86) PCT No.: PCT/EP2016/072535
§ 371 (c)(1),
(2) Date: Mar. 28, 2018

(87) PCT Pub. No.: WO2017/055163
PCT Pub. Date: Apr. 6, 2017

(65) Prior Publication Data
US 2018/0319631 A1 Nov. 8, 2018

(30) Foreign Application Priority Data

Sep. 29, 2015 (EP) .................................. 15187462

(51) Int. Cl.
*B66B 23/00* (2006.01)
*B65G 21/02* (2006.01)
(52) U.S. Cl.
CPC .............. *B66B 23/00* (2013.01); *B65G 21/02* (2013.01)

(58) Field of Classification Search
CPC ......... B66B 23/00; B66B 21/02; B65G 21/02; B65G 21/06
(Continued)

(56) References Cited

U.S. PATENT DOCUMENTS 2,527,307 A  10/1950  Huck
3,078,970 A * 2/1963  Black ..................... E04G 11/54
                                                            52/632
(Continued)

FOREIGN PATENT DOCUMENTS

CN        201942404         8/2011
JP        2006021910        1/2006
(Continued)

OTHER PUBLICATIONS

"Huck BOM—The highest strength blind fasteners in the world." Alcoa Fastening Systems and Rings. Apr. 15, 2015. https://www.alcoa.com/fastening_systems_and_rings/commercial/catalog/pdf/huck/en/AF201_Bom_Brochure.pdf.
(Continued)

*Primary Examiner* — James R Bidwell
(74) *Attorney, Agent, or Firm* — Knobbe Martens Olson & Bear LLP (57) ABSTRACT

This application relates to a method for installing a support structure for a passenger transport system in a construction. The support structure comprises a framework made of load-bearing framework components connected to each other. The method includes placing a plurality of individual framework components, having connection openings designed therein, at an installation position within the construction; and assembling the framework on or near the installation position within the construction by connecting the framework components to each other by way of load-bearing connector components, in that a respective connec-
(Continued)

tor component is arranged to reach through adjacently arranged connection openings of at least two adjacent framework components and is then deformed in respect of the outside geometry thereof, such that they completely fill out the connection openings they reach through, without play.

16 Claims, 6 Drawing Sheets

(58) Field of Classification Search
USPC .................................. 198/321, 326, 860.1
See application file for complete search history.

(56) References Cited

U.S. PATENT DOCUMENTS

| | | | | |
|---|---|---|---|---|
| 3,707,220 | A | * | 12/1972 | Boltrek ................... B66B 23/02 198/330 |
| 4,175,653 | A | * | 11/1979 | Kubota ................... B66B 23/22 198/332 |
| 4,811,829 | A | * | 3/1989 | Nakazawa .............. B66B 23/00 198/326 |
| 4,832,169 | A | * | 5/1989 | Goto ....................... B65G 21/02 198/326 |
| 4,958,473 | A | | 9/1990 | Iyoda |
| 9,676,597 | B2 | * | 6/2017 | Senger ................... B66B 23/00 |
| 2010/0018148 | A1 | * | 1/2010 | Trojer ................. B21D 39/031 52/578 |
| 2016/0376128 | A1 | * | 12/2016 | Gonzalez Pantiga ... B66B 23/00 198/321 |

FOREIGN PATENT DOCUMENTS

| | | |
|---|---|---|
| WO | WO 2011/073708 | 6/2011 |
| WO | WO 2013/029979 | 3/2013 |

OTHER PUBLICATIONS

"Hollo-Bolt—The Original Expansion Bolt for Structure Steel." Lindapter International. Jun. 15, 2012. http://www.ancon.com.au/downloads/s3/11/hollo-bolt.pdf.

International Search Report for International Application No. PCT/EP2016/072535 dated Dec. 15, 2016.

\* cited by examiner

METHOD FOR INSTALLING A SUPPORT STRUCTURE FOR A PASSENGER TRANSPORT SYSTEM IN A CONSTRUCTION

TECHNICAL FIELD

The present invention relates to a method for installing a support structure for a passenger transport system, such as an escalator, a moving sidewalk, etc., in a construction.

SUMMARY

Passenger-transporting systems are used for conveying people, for example, in constructions between different levels or within the same level. For example, escalators, which are sometimes also referred to as moving stairways, are used to convey people, for example, in a construction from one story to another story. Moving sidewalks can be used for conveying people, for example, within one story in a horizontal level or in an only slightly inclined level.

Escalators and moving sidewalks generally comprise a load-bearing structure referred to as a support structure. In this case, the support structure is designed to absorb forces, in particular gravitational forces, acting on the passenger transport system while people are being conveyed, and to transfer said forces, for example, to supporting structures of the construction accommodating the passenger transport system. In this case, suitable bearing points can be provided on the construction for installing the support structure. Depending on the design, the support structure can in this case extend over two or more levels or stories of the construction and/or over short or long distances within the same story inside the construction.

In this case, a support structure that is carried by the bearing points of the construction in the installed state can receive both movable and stationary components of the passenger transport system. Depending on the design of the passenger transport system as an escalator or a moving sidewalk, components of this kind can be designed, for example, as a step belt, pallet belt, turn axles, drive shafts, drive motor, transmission, controller, monitoring system, safety system, balustrade, comb plates, bearing points, raceways and/or guide rails.

Support structures for passenger transport systems are generally designed as framework structures. Framework structures of this kind are conventionally already manufactured by the manufacturer as an entire unit or divided into a plurality of support structure modules. The pre-assembled support structure in the form of a complete unit or divided into a plurality of modules is then transported to and installed in the construction in which the passenger transport system is to be fitted.

A framework forming the support structure is generally composed of a plurality of rod-like framework components. In order to be able to ensure sufficient stability and load-bearing capacity of the support structure, the individual framework components must be connected to each other by sufficiently strong connections.

Conventionally, frameworks for support structures or support structure modules are generally produced by means of, usually, welding together a plurality of profile steel elements of different cross-sectional areas and cross-sectional shapes.

Embodiments of escalators and moving sidewalks having a welded support structure and a metal sheet visible from below are known from WO 2013/029979 A1.

As an alternative to support structures or support structure modules produced by welding framework components, WO 2011/073708 A1 describes a framework that is free of weld seams and comprises rods and screwable nodes.

Inter alia, a method for installing a support structure for a passenger transport system in a construction may be required, which method makes it possible for a support structure of this kind to be assembled and installed inside a construction easily, cost-effectively and/or with high precision. In particular, a method for installing a support structure for a passenger transport system in a construction may be required, which method makes it possible for the support structure to be assembled and installed on-site within a construction, close to a position at which the passenger transport system is to be fitted.

Such a need can be addressed by an installation method as described herein. Advantageous embodiments of the installation method are explained in in the following description.

According to a first aspect of the present invention, a method for installing a support structure for a passenger transport system in a construction is proposed. In this case, the support structure comprises a framework made of load-bearing framework components connected to each other, including top chords, bottom chords, cross members, diagonal members and vertical supports. The method comprises the following steps, preferably in the specified order: First, a plurality of individual framework components having connection openings formed therein are provided and placed at an installation position within the construction. Then, the framework is assembled on or near the installation position within the construction by connecting the framework components to each other by means of load-bearing connector components, in that a respective connector component is arranged to reach through adjacently arranged connection openings of at least two adjacent framework components and is then deformed in respect of the outside geometry thereof. In this case the connector components are designed and are deformed upon connecting framework components such that they completely fill out the connection openings they reach through, without play, after connection of the framework components, and the framework components connect to each other in an interlocking manner in all spatial directions and position the framework components relative to each other when connecting the framework components. Finally, the assembled framework is installed in prepared installation locations of the construction, within the construction.

Without in any way restricting the scope of the invention according to the claims, possible features and advantages of embodiments of the invention may be considered, inter alia, to relate to the findings described hereinbelow.

As indicated briefly by way of introduction, framework structures for support structures of a passenger transport system have, up to now, primarily been produced by welding suitably designed framework components. Welding together a plurality of framework components requires significant time and work. Since the support structure is a safety-relevant component, weld seams used herein may generally only be implemented by highly trained, officially certified workers. Furthermore, significant training is generally required for producing welded structures of this kind, and the finished component usually requires alignment due to action of heat during welding. Furthermore, transporting a complete support structure or individual support structure modules, prefabricated by a manufacturer, to a construction and into the construction in which the passenger transport system is to be fitted may require significant effort and thus result in significant costs.

In the framework that is free of weld seams, as set out in WO 2011/073708 A1 for example, that is described as an alternative to welded frameworks, rods forming framework components are connected to each other using screwable nodes. It is thus intended for it to be possible to produce a framework that is as non-warping as possible. However, the framework disclosed has to be laboriously assembled, using training, since the individual connection elements have too many degrees of freedom in one plane, due to existing play. Furthermore, there may be a fear that the connection elements constitute a safety risk, since the screws inserted here may loosen from clamping elements. In addition, it should be assumed that the connection of the individual framework components is merely frictional, at least with respect to one degree of freedom, and therefore the entire framework could warp, for example, due to a lateral action of force.

In the method proposed herein for installing a support structure for a passenger transport system, as in the mentioned prior art, load-bearing framework components that form a framework are intended to be connected to each other without welded joints, or at least without welded joints that bear the main portion of the load acting on the framework.

For this purpose, a specific type of mechanical connection of two or more framework components to each other is to be used. The specific type and properties of said connections result mainly from the connector components used therefor. Said connector components are intended to have sufficient mechanical stability to be able to absorb at least the main portion of the forces and loads acting on the framework, i.e., the connector components should be load-bearing. In particular, the connector components are intended to be load-bearing such that they can withstand preferably at least the same loads as the framework components they connect. At the same time, the connector components are intended to be designed and able to be installed so as to position two or more framework components relative to each other in a specifiable manner when connecting said framework components.

In order for it to be possible to connect the framework components to a framework, each of the framework components is equipped with connection openings. Said connection openings can be formed as through-openings or holes in each of the framework components. The connection openings are preferably rotationally symmetrical, in particular having a round or circular cross section. A cross-sectional area of the connecting openings may be between 0.1 cm$^2$ and 20 cm$^2$, for example, which corresponds to a diameter of between approximately 4 mm and 50 mm in the case of circular connection openings. Preferably all the connection openings provided in the various framework components are designed in the same way, in particular having the same cross-sectional area and same contour. In this case, in general at least two connection openings are formed in a framework component, for example, close to opposite ends of the framework component.

During assembly and installation of the support structure, the individual framework components can be connected to each other by means of the load-bearing and positioning connector components already mentioned. For this purpose, two or more framework components can be arranged relative to each other such that two of the connection openings thereof formed therein come to rest adjacently to one another and are preferably mutually aligned. A connector component can then be arranged so as to reach through such adjacently arranged connection openings. After the connector component has been positioned in this way, it is deformed such that the outside geometry thereof changes. In this case, the connector components used for this purpose are specially designed such that, after installation, i.e., after deformation of the relevant connector component and thus in a state when connecting at least two framework components, said connector components completely fill out, without play, the connection openings they reach through of the framework components to be connected.

In this case, filling out the connection openings completely and without play can be understood to mean that, during installation, the outer surfaces of the connector components rest or nestle against surfaces of the framework components, in particular surfaces that form an inner boundary of the connection openings, such that the connector components are held on the framework components, and in particular in the connection openings thereof, without play in all spatial directions.

In this case "without play" is to be understood to mean that, on account of an interlocking connection brought about by the connector components, the framework components connected to each other preferably cannot move relative to each other in any direction, or at least can move relative to each other by less than 0.3 mm, preferably less than 0.1 mm, or more preferably less than 0.03 mm. In other words, the connector components are intended to be designed and installed so as to connect the framework components to be connected by means of an interlocking connection in all spatial directions. In this case, the interlocking connection is intended to act, inter alia, also in directions within a plane formed by the framework components, i.e., in directions perpendicular to a longitudinal extension of an elongate connector component.

In this respect, the connector components to be used for installing the support structure proposed herein differ from simple connector components conventionally used for frameworks such as bolted joints or conventional riveted joints. Bolted joints or conventional riveted joints usually only bring about an interlocking connection in one longitudinal direction of the connector components, while the framework components connected to each other are merely frictionally connected in directions transverse to said longitudinal direction. In particular, bolted joints or riveted joints, such as rivet fastenings, having hot or cold-formed closing heads always have a certain amount of lateral backlash in the connection openings penetrated thereby.

According to an embodiment, the connector components are designed in such a way and the outside geometry thereof is deformed in such a way during connection of the framework components that, upon connecting at least two adjacent framework components, said connector components can be widened, at a lateral surface that reaches through the connection openings, such that they completely fill out the connection openings without play, and in the process the widened lateral surface exerts a radially outwardly acting pressure on the inner edges of the connection openings.

In other words, the connector components are preferably designed so as to have a lateral surface that is dimensioned such that said connector components can be pushed through adjacently arranged connection openings of two adjacent framework components without problem, i.e., so as to have a certain amount of play. Subsequently, the connector components are intended to be able to be deformed, upon continued installation, such that the lateral surface reaching through the connection openings is radially widened. In other words, a portion of the connector components located in the connection openings is intended to be able to enlarge, in terms of the cross-sectional area thereof, preferably by a deformation that is as largely plastic as possible. Such widening of the lateral surface of the connector component allows said component to completely fill out the connection openings without play in the fully installed state, i.e., the entire periphery of the lateral surface can preferably rest completely and without play on an inside boundary surface of the connection openings. In this case, the lateral surface is intended to be widened during the installation process to such an extent as to even exert a certain amount of pressure outwards, on inner edges of the connection openings, in the radial direction. Said pressure can originate, for example, from permanent elastic deformation of the lateral surface and/or the edges of the connection openings. In other words, the fully installed connector components should be fitted into the associated connection opening so as to have an interference fit.

Such complete filling out of the connection openings of adjacently arranged framework components, without play, brought about during installation of the connector components not only results in said framework components being connected to each other in an interlocking manner in all spatial directions, but the special installation process also means that the framework components are very precisely positioned relative to each other on account of the interference fit brought about. As will be described in greater detail below, this may be very important for assembling the support structure and for the resulting support structure.

According to an embodiment, the connector components are rivets, in particular, blind clinch bolts. Alternatively, the connector components can be designed having a sleeve and at least one taper that is received in the sleeve and can be displaced relative to the sleeve.

A rivet is a plastically deformable, generally cylindrical, connection element, by means of which, for example, sheet metal parts can be joined together. Using a rivet, an interlocking rivet fastening between two components can be produced in the longitudinal direction of the rivet. Rivets can typically be produced from metals such as steel, copper, brass, aluminum alloys or titanium or the like, and optionally also from plastics materials. In general, there are a number of different types of rivets, such as solid rivets, hollow rivets, blind rivets, punch rivets, etc., the properties of which can be adapted for use in specific applications. In the present case, it may be considered essential for a rivet to be inserted, during installation, into connection openings of components to be connected that said rivet reaches through in such a way as to completely fill out said connection openings, without play, at least when the installation process is complete, in that, for example, the lateral surface of said rivet is appropriately widened during the installation process.

Blind clinch bolts are a special form of a hollow rivet which require access only to one side of components to be connected, and are typically installed using a special rivet gun. In addition to a hollow rivet body having a head at the front end, a blind clinch bolt generally consists of an elongate inserted pin that has a head at the rear rivet end and is provided with a predetermined braking point.

A special high-strength blind clinch bolt that is considered particularly suitable for manufacturing a support structure described herein is marketed by the company Alcoa Fastening Systems & Rings, under the name Huck BOM®. Basic principles of a blind clinch bolt of this kind have already been described in U.S. Pat. No. 2,527,307. It is also specified here that, when installing a blind clinch bolt of this kind, a sleeve-like shank that was previously introduced into connection openings of two components to be connected is first radially widened in that a "shoulder," having a cross section that is slightly wider than an inner cross section of the shank, is pulled through the shank and plastically deforms said shank outwardly, such that the lateral surface of the shank rests fully against inner surfaces of the connection openings. Only subsequently are suitably designed rivet heads formed by appropriate plastic deformation of end regions of the shank, such that the components to be connected are fixed to each other in an interlocking manner in all spatial directions by means of the fully installed blind clinch bolt.

Alternatively, the connector components can be designed having a sleeve and at least one taper that is received in the sleeve and can be displaced relative to the sleeve. Preferably, two tapers that taper in opposite directions can be received in the sleeve. In order to install connector components of this kind, one taper or both tapers can be moved relative to the sleeve such that the sleeve is widened outwardly from the inside in order to completely fill out the connection openings it reaches through, without play, and to bring about an interference fit as far as possible.

According to an embodiment, the connector components are designed and are deformed in respect of the outside geometry thereof upon installation such that they completely fill out the connection openings they reach through, without play, such that they position the connection openings relative to each other so as to have a tolerance of less than 0.3 mm, preferably less than 0.1 mm, or more preferably less than 0.03 mm.

Furthermore, the connection openings can preferably be made in the framework components so as to be positioned relative to one another at a tolerance of less than 0.3 mm, preferably less than 0.1 mm, and more preferably less than 0.03 mm.

In other words, the connection openings are spatially very precisely designed and arranged in the framework components. In this case, the "tolerance" is intended to relate both to the position at which a connection opening is arranged in a framework component, and to the dimensions and contours of said opening. Such precisely positioned and designed connection openings make it possible for correspondingly suitable connector components to then be installed so as to reach through said openings, which connector components, on account of the property thereof to completely fill out the connection openings without play and preferably so as to have an interference fit after being installed, can also position, relative to each other and at a very small spatial tolerance, the connection openings of the framework components to be connected.

On account of both the positioning accuracy of the connection openings in the framework components, and of the positioning accuracy of the connector components, it is thus possible for the framework ultimately assembled to be constructed from framework components that are positioned and connected very precisely relative to each other, and thus to even achieve a target geometry having very low manufacturing tolerances. For example, a framework for an entire support structure for a passenger transport system several meters long can be produced having manufacturing tolerances of a few millimeters, often even just a few tenths of millimeters.

The connection openings can preferably be made in the framework components by laser cutting or water jet cutting, for example. Computer-assisted machining methods of this kind allow connection openings to be made extremely precisely in components of this kind. Since laser cutters or water jet devices used for this purpose are controlled using a computer, the connection openings can moreover be formed in the framework components in an extremely reproducible manner and so as to be very precisely arranged relative to each other. This makes it possible for the framework to be assembled without training and having all connection openings already formed on the framework components. The largest disadvantage of conventional manufactured, riveted framework constructions, i.e., that, here, the connection openings can sometimes only be formed upon assembly, since they otherwise do not align on account of common manufacturing tolerances, is eliminated by the precise arrangement of the connection openings in the framework components and by the use of the permanently precisely positioning connector components.

According to an embodiment, all the cross members, diagonal members and vertical supports of the framework are manufactured so as to be structurally identical in each case. In other words, the cross members of a framework, the diagonal members of the framework and the vertical supports of the framework are geometrically identical in each case. Framework components of this kind can thus be prepared and stored as pre-fabricated standard parts and can be used as required to produce a support structure. In this case, standard parts of this kind can be used for support structures of different geometries, it being possible for an individual design of the framework for a specific support structure to primarily be achieved by top chords and bottom chords, produced to order, and the connection openings to be appropriately arranged and formed therein. The top and bottom chords can then be connected to each other by appropriately pre-fabricated standard parts in the form of uniform cross members, uniform diagonal members and uniform vertical supports, and the framework can thus be formed.

According to an embodiment, the cross members, diagonal members and/or vertical supports are produced from metal or metal sheets. Metal sheets of this kind can be shaped particularly easily by laser cutting or water jet cutting, it being possible for both an outer contour and connection openings to be provided therein to be formed very precisely.

According to an embodiment, the top chords and bottom chords are designed and produced to order. In contrast with the various members and vertical supports, which are preferably pre-fabricated and made available as standard parts in large numbers in order to then be able to be used by manufacturers of passenger transport systems of various kinds, the top chords and bottom chords generally have to be designed to order. Such designing may, for example, comprise dimensioning the lengths of the top chords and bottom chords, which chords are to be oriented specifically to the conditions within the construction to be equipped with the passenger transport system. It may also be necessary to dimension cross sections of the top cords and bottom chords to order, so as to adapt a final loading capacity of the support structure to local conditions and/or specification requirements, for example. In this case, designing the top chords and bottom chords can also comprise calculating suitable positions for the connection openings to be made therein, in order that the top chords and bottom chords can be connected to the members and vertical supports to form the desired framework.

According to an embodiment, the top chords and bottom chords can be produced from rectangular tubes. Using rectangular tubes can ensure sufficient mechanical load-bearing capacity of the top and bottom chords, and ultimately of the entire framework. Suitable connection openings can be made in the rectangular tubes, optionally again by laser cutting or water jet cutting.

According to an embodiment, individual framework components can be composed of a plurality of sub-components. For example, a vertical support can be composed of a plurality of sub-components, each sub-component being a partial sheet precisely cut from a metal sheet, for example.

In this case, the sub-components can optionally be connected to each other by a non-load-bearing welded joint, clinched connection or crimped connection. A welded joint, clinched connection or crimped connection of this kind can hold the sub-components together at least during assembly of the framework, such that the assembly can be carried out more easily. In this case, the welded joints, clinched connections or crimped connections do not, however, need to be load-bearing, i.e., they do not need to be able to withstand the forces later applied to the support structure, but merely need to be able to hold the sub-components of a framework component together during the process of assembling the framework. Of course, said connections can also be designed to be load-bearing if the specific design requires this.

According to an embodiment, the framework components and/or the sub-components of framework components can be connected to each other by a non-load-bearing insertion connection. Insertion connections of this kind can, for example, facilitate production or installation of the framework component and/or simplify positioning of the framework components relative to each other during production or installation. Using insertion connections, the framework components can first be connected to each other in a roughly positioned manner or sub-components of a framework component can be connected in a manner positioned roughly relative to each other, before the framework components and optionally the sub-components thereof are then ultimately connected in a mechanically stable and precisely positioned manner by means of connection using the mentioned load-bearing and positioning connector components.

According to an embodiment, during assembly of the framework, the framework components are connected to each other in the following sequence: first, H-frames are pre-installed by in each case connecting two vertical supports to at least one cross member using the connector components. The pre-installed H-frames are then connected to the top chords and the bottom chords, in each case using the connector components. Finally, the diagonal members are inserted and are connected by the connector components.

In this case, the H-frames are H-shaped segments in which two vertical supports that are arranged in parallel with each other and vertically, are connected to each other by one, two or more cross members. In this case, both the individual framework components and the H-frames composed thereof can generally be handled and assembled easily by one person alone, but at least by just two people. In this case, it is possible to advantageously make use of the fact that the connector components used to connect the framework components can generally be installed easily, for example, using a tool actuated using just one hand, for example, riveting pliers. Moreover, it is possible to advantageously make use of the fact that, during installation of the connector components, not only are the framework components to be connected rigidly connected to each other in all directions by said connector components, by forming an interlocking connection, but the framework components are simultaneously also positioned relative to each other, in a desired manner, on account of the positioning property of the connector components.

The H-frames pre-installed in this way are subsequently each connected to the top chords and the bottom chords. This, too, can generally be achieved by one person alone, but at least by just two people, in particular owing to the advantageous properties of the connector components to be used here.

Finally, the diagonal members can be inserted into the incomplete framework prepared in this way, and said members can each be connected to some of the already pre-installed framework components, i.e., for example, to extension pieces on the vertical supports, using connector components. Once again, this, too, can be carried out by just one person or at most two people.

Overall, the entire framework can thus be assembled easily by at most two people using the specified production sequence. In this case, these people each handle relatively small and thus lightweight framework components or segments, at the most an H-frame, for example. In this case, a highly stable and simultaneously highly precisely aligned framework can ultimately be produced, as a support structure for a passenger transport system, owing to the advantageous properties of the connector components used for connecting the framework components or segments. The people employed for this do not require any special technical knowledge in order to assemble the framework. In particular, they do not need to be certified welders.

According to an embodiment, the top chords and/or the bottom chords are composed of a plurality of sub-segments, each sub-segment comprising connection openings, and the sub-segments being connected by the connector components.

In other words, the top chords or bottom chords do not need to be provided as generally very long and integral components which would be difficult to transport and in particular difficult to place at an installation location within a construction. Instead, the top chords and/or bottom chords can be composed of a plurality of sub-segments one behind the other, in order to form sufficiently long components when assembled, which components can, for example, bridge a connection distance between two different installation locations within a construction. In this case, each sub-segment can have a relatively short length, such that said segment can, for example, be handled, preferably without special auxiliary aids, and placed in an interior of a construction by one person alone. The sub-segments can then be connected to each other on or near the installation position within the construction. In this case, the load-bearing and positioning connector components can advantageously be used again in order to connect the sub-segments, such that the sub-segments connected to each other can be connected to each other in both a stable and precisely located manner, and the sub-segments can be connected easily and preferably by staff who are not specially trained.

According to an embodiment, at least one element from a group comprising a rail block, flange parts of a drive space and flange parts of a tension station is additionally incorporated into the passenger transport system by means of connection to framework components of the framework by the connector components.

The rail block, flange parts of the drive space and flange parts of the tension station typically form construction components of an escalator or a moving sidewalk. Said construction components need in general to be received in the support structure of the passenger transport system and/or retained thereby. For this purpose, said construction components need to be connected to the framework of the support structure in a mechanically stable manner. It is proposed for the mentioned construction components to be connected to framework components of the framework using the load-bearing and positioning connector components described herein. In this way, the construction components can be installed in or on the framework in a simple and precisely positioned manner, and the forces acting on the construction components that arise during operation can be transmitted to the framework components of the support structure by means of the interlocking connection brought about by the connector components.

It should be noted that some of the possible features and advantages of the invention are described here with reference to different embodiments. In particular, possible features and advantages of the invention are described in part with reference to embodiments of a support structure and in part with reference to a method for producing a support structure of this kind and/or to a method for installing a support structure of this kind in a construction. A person skilled in the art recognizes that the features described for individual embodiments may be transferred to other embodiments as appropriate and features can be combined, adapted and/or exchanged as appropriate in order to yield other embodiments of the present invention.

It should further be noted that the applicant of the present application filed two further patent applications, on the same day as the present patent application, having the titles "Method for producing a support structure for a passenger transport system" and "Support structure for a passenger transport system." These applications, which are similar in content, additionally set out possible features of a support structure, a method for the production thereof or a method for the installation thereof, as can optionally also be applied analogously to the invention described herein.

BRIEF DESCRIPTION OF THE DRAWINGS

Embodiments of the present invention are described below with reference to the accompanying drawings, neither the drawings nor the description being intended to be interpreted as limiting the invention.

The drawings are only schematic and are not true to scale. Like reference signs refer in the different drawings to like or analogous features.

DETAILED DESCRIPTION

Figure 1:
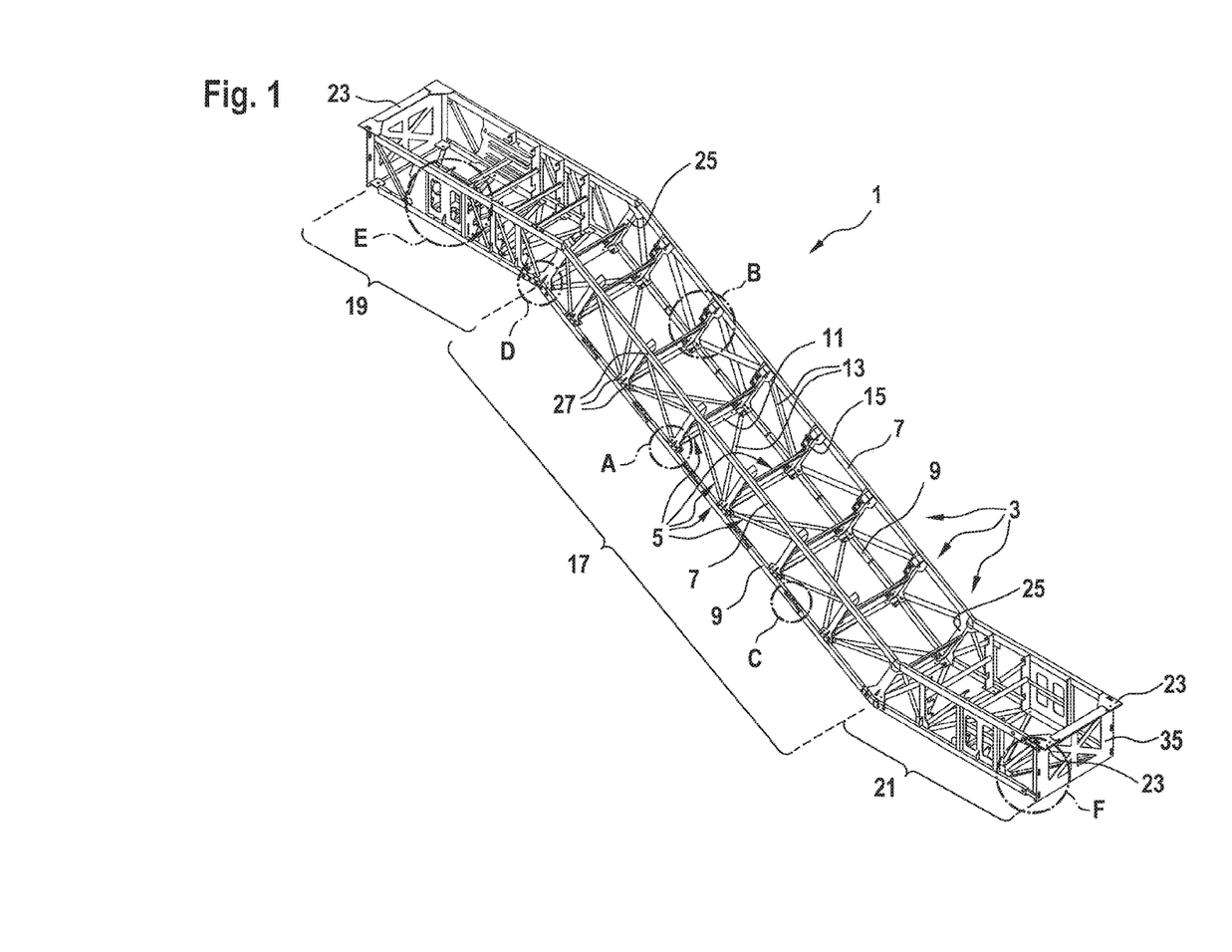
FIG. 1 shows a support structure as it can be installed according to an embodiment of the present invention.

FIG. 1 shows a support structure 1 for a passenger transport system. In the example shown, the support structure 1 is designed as a framework 3 that can form a load-bearing structure for an escalator by means of which people can be conveyed between two stories of a construction, for example.

The framework 3 of the support structure 1 is composed of a plurality of framework components 5 connected to each other by connector components 27. In this case, some of the individual framework components 5 form top chords 7 and bottom chords 9 that extend in parallel with each other and in parallel with the extension direction of the elongate support structure 1. Other framework components 5 form cross members 11, diagonal members 13 and vertical supports 15 that extend transversely to the top and bottom chords 7, 9 and connect said chords.

In the present embodiment, a central region 17 of the support structure 1 extends in an inclined manner when mounted as intended in a construction. A horizontally extending top end region 19 that is also designed in the manner of a framework and that can support an upper landing place or an upper step-on region of the moving sidewalk and in which, for example, a rail block and/or a drive space can be accommodated adjoins the top end of said central region. A bottom end region 21 that is again designed in the manner of a framework and in which, for example, a further rail block and/or a tension terminal can be received adjoins a bottom end of the central region 17.

At the top and bottom end region 19, 21, the support structure 1 can be connected to and borne by supporting structures of a construction in the region of a framework termination component 35 by means of support brackets 23. At the top and bottom transitions between the central region 17 and the top end region 19 or the bottom end region 21, what are known as angled vertical supports 25 are provided in the framework 3, which angled vertical supports connect the top chord 7 and the bottom chord 9 to each other at a bend in the framework 3 located there.

FIGS. 2a to 2f show enlarged details of the support structure 1 shown in FIG. 1 at the regions marked A to F therein.

Figure 2A:
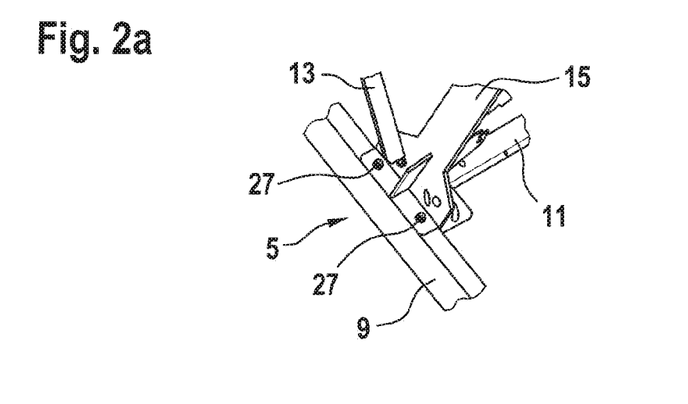
FIGS. 2a-2f show details of the support structure shown in FIG. 1.

In this case, FIG. 2a shows a connection of four framework components 5, in which a vertical support 15, a diagonal member 13, a cross member 11 and a bottom chord 9 are rigidly connected to each other using connector components 27. In this case, the vertical support 15, the diagonal member 13 and the cross member 11 are all provided in the form of cut and optionally bent sheet metal profiles, at least the vertical support 15 being composed of a plurality of sub-components in the form of individual and differently cut metal sheets. The bottom chord 9 is formed having a rectangular tube.

Figure 2B:
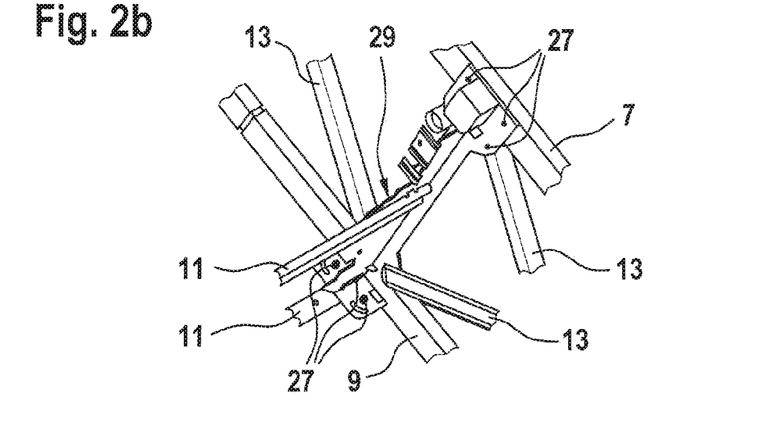

FIG. 2b is a further partial view of a region of the framework 3 in which a top chord 7 and a bottom chord 9 are connected to each other by means of a vertical support 15 and diagonal members 13 and are connected to parallel top and bottom chords 7, 9 (not shown), respectively, by means of cross members 11. Furthermore, frames 29 are formed on the vertical support 15 as receptacles for rails. In this case, all the framework components mentioned are again rigidly connected to each other by suitable stable and positioning connector components 27.

Figure 2C:
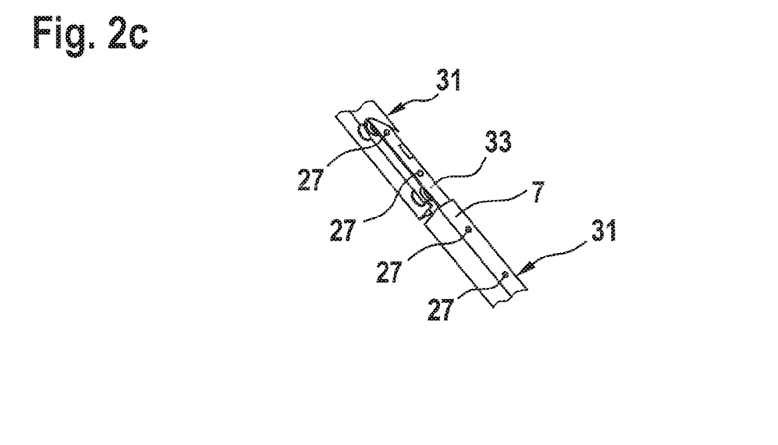

FIG. 2c shows a partial region of a top or bottom chord 7, 9 assembled from a plurality of sub-components 31. The sub-components 31 are each formed as rectangular tubes and arranged one behind the other in the longitudinal direction. At a joint region, the two sub-components 31 are connected to each other by means of a connecting part 33 arranged inside the rectangular tube. In this case, the connecting part 33 is in turn connected to each of the sub-components 31 of the top or bottom chord 7, 9, respectively, by means of stable, load-bearing and positioning connector components 27. In this way, a top or bottom chord 7, 9 that is usually several meters long can be composed from a plurality of segments and does not need to be transported as a bulky unit and mounted in a construction, for example.

Figure 2D:
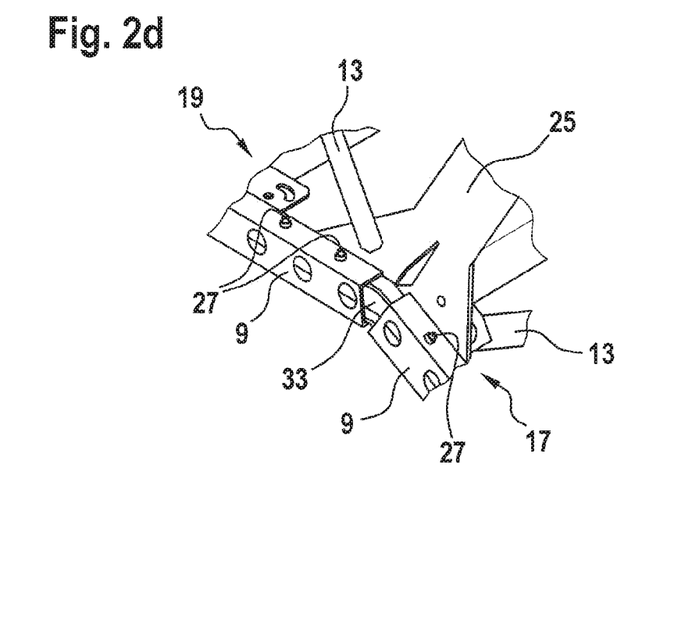

FIG. 2d shows a partial region of the framework 3 in which a bottom chord 9 emerging obliquely from the central region 17 transitions into another portion of the bottom chord 9 that extends horizontally in the top end region 19. An appropriately designed angled vertical support 25 is placed in this position and connects both the obliquely extending portion of the bottom chord 9 and the horizontally extending portion of the bottom chord 9 to a top chord 7 (not shown). Furthermore, the portions of the bottom chord 9 extending in mutually obliquely oriented directions are connected to each other by a connecting part 33 accordingly formed having a bend. The individual framework components are in turn connected to each other by load-bearing and positioning connector components 27.

Figure 2E:
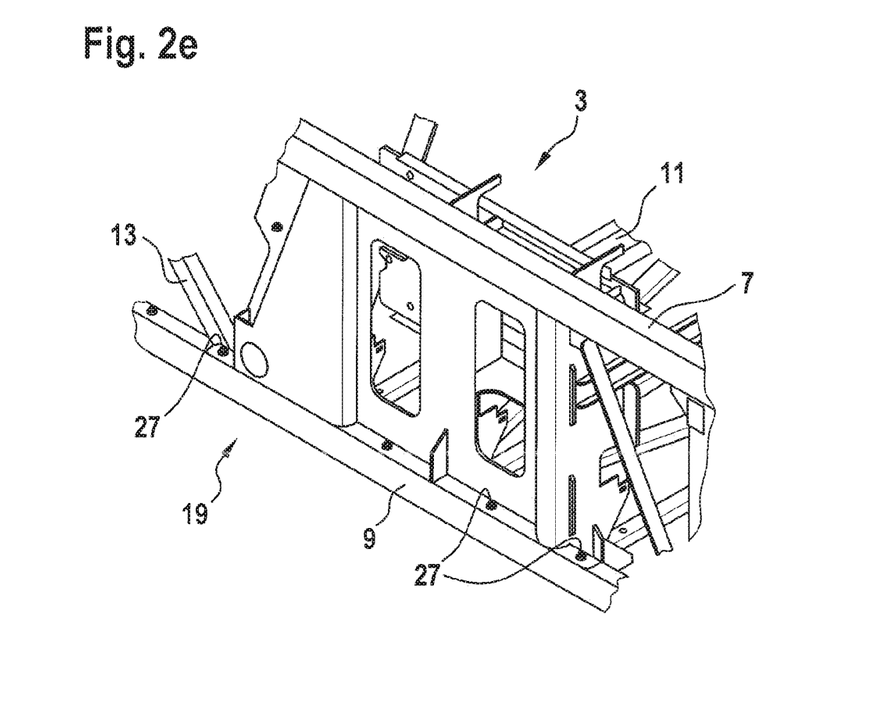

FIG. 2e is a partial view of the top end region 19 of the framework 3. Here, too, a plurality of different framework components is again connected by connector components in a load-bearing manner and so as to be precisely oriented relative to each other.

Figure 2F:
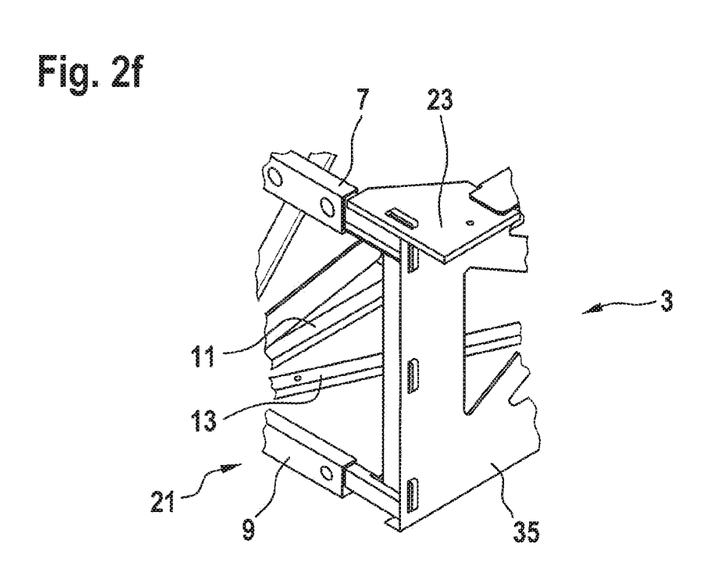

Finally, FIG. 2f is a partial view of a region of a framework termination component 35 in the bottom end region 21 of the framework 3.

In the following, a principle of the process of connecting two framework components 5 using a connector component 27 will be explained with reference to the highly schematic FIG. 3.

Both framework components 5 can be sheet metal profiles cut out of a metal sheet and optionally subsequently bent, chamfered or further processed in another manner, for example. In particular, the framework components 5 can be cut, in a computer-controlled manner, from a metal sheet using precise cutting methods such as laser cutting or water jet cutting. In the process, connection openings 39 can be formed, in a highly accurately positioned manner, at suitable positions previously determined during a design phase for configuring the support structure. In this case, the connection openings can be designed very precisely using the mentioned cutting methods, such that the position and the geometry of said openings can be specified, for example, within a tolerance range of just a few tenths of a millimeter, in particular less than 0.3 mm. In this case, the connection openings 39 formed in the different framework components 5 are preferably all identically designed, such that inside edges of said connection openings can be aligned with each other when the connection openings 39 of two or more framework components 5 are to be arranged adjacently beside or behind each other.

In order to connect two or more framework components 5 to each other, said components are arranged beside or behind each other, in exactly the manner mentioned, and a connector component 27 is inserted into the aligned connection openings 39 so as to reach through all the adjacently arranged connection openings 39.

Subsequently, the connector component 27 is deformed in respect of the outside geometry thereof. In this case, the connector components 27 are designed and are deformed upon connecting framework components 5 such that they completely fill out the connection openings 39 they reach through, without play, after connection of the framework components 5, and can connect the framework components 5 to each other in an interlocking manner in all spatial directions and in addition precisely position the framework components relative to each other when connecting said framework components.

For this purpose a connector component 5 can be designed such and the outside geometry thereof can be deformed, during connection of the framework components 5, such that, upon connection of the framework components 5, said outside geometry is widened at a lateral surface 41 reaching through the connection openings 39 such that said connector component can subsequently completely fill out the connection openings 39 without play. After deformation of the lateral surface 41, the lateral surface 41 of the connector component 27 preferably presses against the inside edges of the connection opening 39 with even greater pressure, i.e., is mechanically biased radially outwards against the inner edges of the connection opening 39 in a manner having an interference fit.

Figure 3:
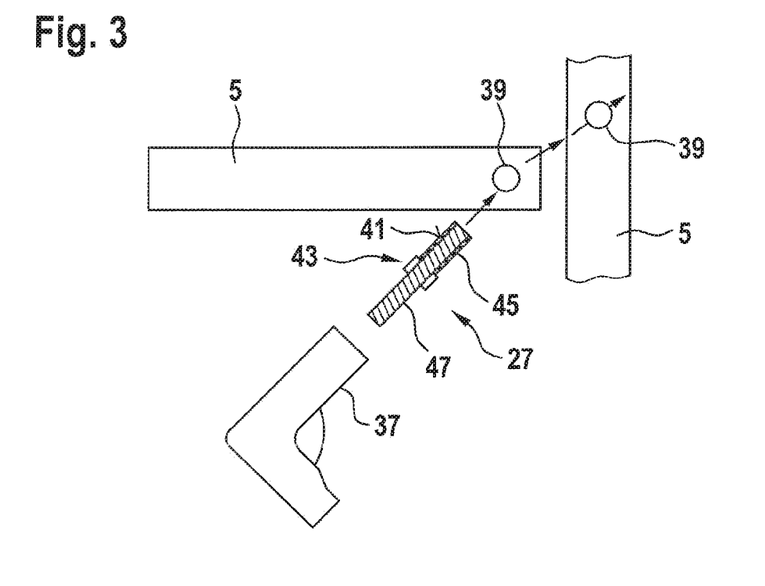
FIG. 3 shows a process of assembling framework components of a support structure installed according to the invention.

In this case, in the example shown in FIG. 3, the connector component 27 is formed as a high-strength blind clinch bolt 43. Once it has been pushed through the connection openings 39, said blind clinch bolt 43 can be deformed, from one side, in the manner described above, using riveting pliers 37 or another suitable tool.

Figure 4A:
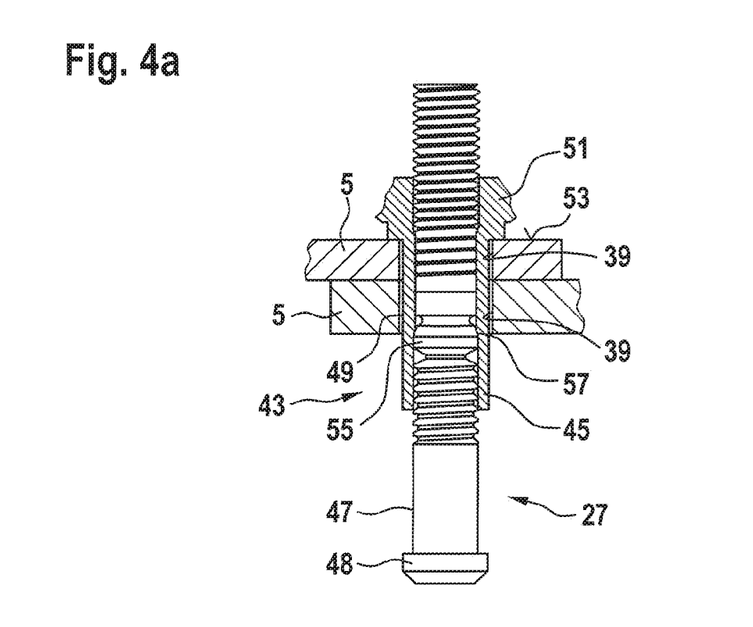
FIGS. 4a, 4b show a connector component for a support structure installed according to the invention at different stages of installation.
Figure 4B:
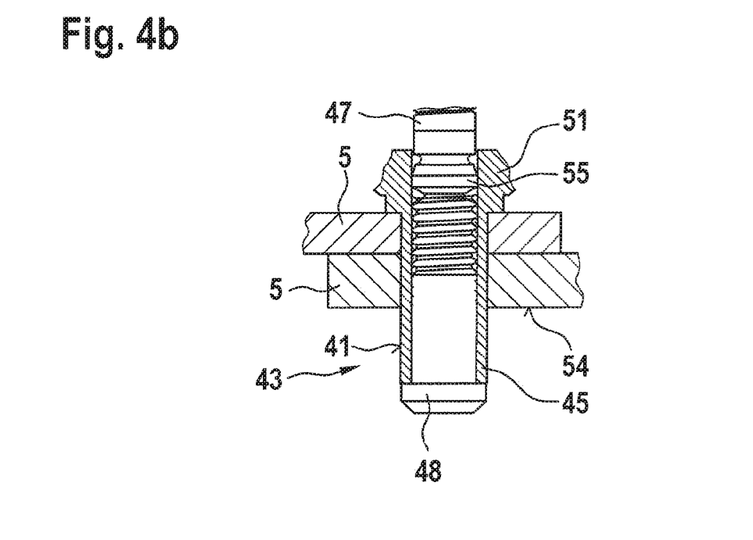

FIGS. 4a and 4b show details of an example of a blind clinch bolt 43 of this kind before and after deformation. Blind clinch bolts 43 of this or of a similar type are marketed inter alia under the name "Huck BOM®." Details of a blind clinch bolt of this kind are described by way of example in U.S. Pat. No. 2,527,307.

The blind clinch bolt 43 comprises a sleeve 45 and a pin 47 which inter alia also extends through a hollow interior of the sleeve 45. At a distal end, the pin 47 comprises a head 48 having an enlarged cross section. In this case, the outer periphery of the head 48 approximately corresponds to an outer periphery of the sleeve 45 and is slightly smaller than an inner periphery of the connection openings 39 in the framework components 5 to be connected, such that the blind clinch bolt 43 can be inserted into a gap 49 in the connection openings 39 without problem and so as to have a certain amount of play. At a proximal end, the sleeve 45 comprises a thickening 51, the outer periphery of which is larger than the inner periphery of the connection openings 39. The thickening 51 thus forms a stop, by means of which the blind clinch bolt 43 rests on an outer surface 53 of one of the framework components 5 when inserted into the connection openings 39.

The sleeve 45 has a smaller material thickness near the distal end thereof that, during installation and following insertion into the connection openings 39, protrudes distally from the framework components 5 to be connected than in a central region located inside the connection openings 39 following insertion into the connection openings 39. In other words, a material thickness of the sleeve 45 increases slightly proximally to a transition point 57. Accordingly, an inner diameter of the sleeve 45 reduces slightly proximally to said transition point 57.

The pin 47, in turn, has a shoulder region 55, the outer periphery of which still fits into the distal region of the sleeve 45 but is slightly larger than the inner periphery of the sleeve 45 proximally to the transition point 57.

When installing the blind clinch bolt 43, the pin 47 is moved, using the riveting pliers 37, to the proximal end of said bolt. In the process, the shoulder region 55 is pressed through the region of the sleeve 45 above the transition point 57, which region narrows towards the inside, and plastically deforms said sleeve in the process. As a result, the sleeve 45 widens radially outwardly from the inside, and in the process closes the previously existing gap 49, as shown in FIG. 4b. Following deformation of this kind, the blind clinch bolt 43 thus completely fills out the connection openings 39, i.e., following the plastic deformation carried out during installation, the outer lateral surface 41 of said bolt rests on the inner boundary of the connection openings 39 without play and preferably so as to have an interference fit. The sleeve 45 can therefore also be referred to as an expansion sleeve.

As the installation process continues, the pin 47 is then moved further towards the proximal end and in the process deforms the end of the sleeve 45 protruding distally from the framework components 5, in order to place said sleeve, in a manner similar to a conventional blind rivet, in an interlocking manner against a surface 54 of said connector component 5 (not shown in FIG. 4b).

The plastic deformation of the sleeve 45 of the blind clinch bolt 43 carried out during the installation process thus ensures that said sleeve completely fills out the connection openings 39 in the framework components 5 without play and thus, in addition to an interlocking connection in the longitudinal extension direction of the blind clinch bolt 43, as also usually occurs in the case of conventional rivets, an interlocking connection is also established in all directions transverse to said longitudinal extension direction, i.e., an interlocking connection in directions in which the framework components 5 extend. The framework components 5 can be connected to each other in a very stable and reliable manner on account of an interlocking connection of this kind acting in all spatial directions.

At the same time, the widening of the sleeve 45 during the installation process can very precisely align the two connection openings 39 of the adjacently arranged framework components 5 and thus position the two framework components 5 very precisely relative to each other. In this case, a very precise positioning tolerance of, for example, a few tenths of millimeters, particularly preferably less than 0.3 mm, can be achieved.

Figure 5:
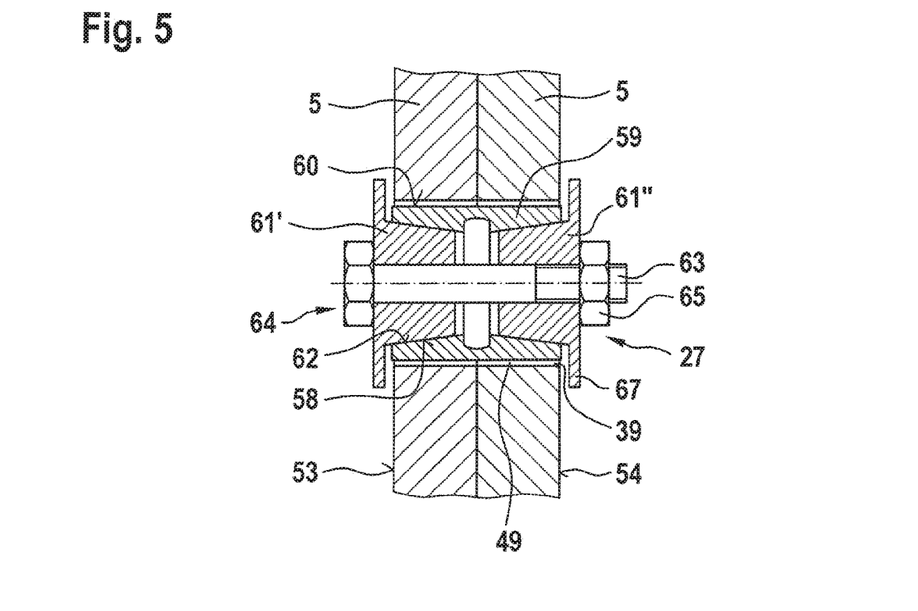
FIG. 5 shows an alternative connector component for a support structure installed according to the invention.

FIG. 5 shows an alternative variant of a connector component 27 as can be used for connecting the framework components 5 of the support structure described herein.

In this case, the connector component 27 comprises a hollow-cylindrical sleeve 59 and a first and a second taper 61', 61". The sleeve 59 has a greater wall thickness in the axial center thereof than at the axial edges thereof. Accordingly, an inner diameter of the sleeve 59 is greater at the axial edges than in the axial center of the sleeve 59. The first taper 61' and the second taper 61" are opposingly oriented and engage in the sleeve 59, conical outer surfaces 62 preferably being correspondingly formed so as to be complementary to the inner surfaces 58 of the sleeve 59. In particular, the sleeve 59 can consist of a plastically deformable material, in particular metal, such as steel, and can have a material thickness that allows plastic deformation of the sleeve 59 by forces exerted by the tapers 61', 61".

The entire connector component 27, consisting of the sleeve 59 and the two tapers 61' 61", is introduced into connection openings 39 of two adjacent framework components 5, which openings are oriented so as to align with each other. In this case, a certain amount of play in the form of a gap 49 exists between an outer surface 60 of the sleeve 59 and an inner boundary of the connection openings 39.

A clamping element 64 passes through the two tapers 61' 61", which clamping element is shown as a screw 63 having an associated nut 65 in the example shown. Alternatively, the clamping element 64 can also be designed in another manner, for example, having a rivet, in particular a blind rivet. The clamping element 64 can be used to move the two tapers

61', 61" axially towards each other, i.e., towards the center of the sleeve 59. In this case, the outer surfaces 62 of the tapers 61', 61" slide along the inner surfaces 58 of the sleeve 59 and expand said sleeve radially outwardly. The sleeve 59 can therefore also be referred to as an expansion sleeve, and the tapers 61', 61" as expansion tapers.

This results in plastic deformation of the sleeve 59, as a result of which the initially present gap 49 is closed and the connector component 27 completely fills out the connection openings 39 without play, and preferably so as to have an interference fit, following installation thereof.

Radially protruding flanges 67 are provided on axially outer ends on the two tapers 61', 61", which flanges rest, in the fully installed state, on outer surfaces 53, 54 of the framework components 5 and can hold said components in an interlocking manner in the longitudinal extension direction of the clamping element 64.

Thus, overall, also using a connection component 27 of this kind comprising a sleeve 59 and at least one taper 61', but if possible two tapers 61', 61", the two framework components 5 can be connected to each other in an interlocking manner in all directions and in the process be simultaneously oriented relative to each other in a precisely positioned manner.

Figure 6:
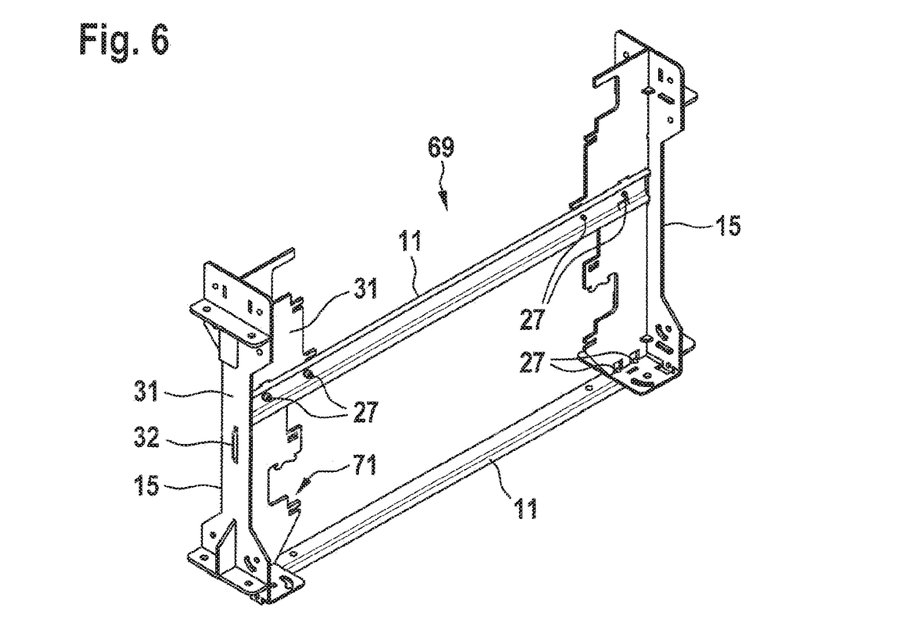
FIG. 6 shows framework components pre-installed to form an H-frame for a support structure installed according to the invention.

FIG. 6 shows a pre-installed "H-frame" 69 which can form a component part of a framework 3 of a support structure 1. The H-frame 69 comprises two vertically extending vertical supports 15 which are connected to each other by two horizontally extending cross members 11. In this case, two connector components 27 in each case provide a load-bearing mechanical connection between the vertical supports 15 and the cross members 11 in each case. Due to being designed so as to have a positioning effect during installation, the connector components 27 furthermore make it possible for the vertical supports 15 and the cross members 11 to be connected so as to be extremely precisely positioned relative to each other. If, furthermore, the connection openings 39 in the individual vertical supports 15 and cross members 11 are designed very precisely with respect to the mutual spacing thereof, for example, by means of computer-assisted laser cutters or water jet cutters, a very precisely manufactured H-frame 69 can thus be pre-installed without it being necessary for any load-bearing welding to be carried out in the process.

Instead, the connector components 27 can be easily installed, for example, even by unskilled workers. Therefore, by pre-installing a plurality of H-frames 69 and connecting said H-frames 69 using diagonal members 13 inserted therebetween and also attached in a precisely positioned manner using connector components 27, as well as parts of the top chord 7 and of the bottom chord 9, an entire framework 3 for a support structure 1 can thus be assembled overall in a simple manner, requiring few staff, and very quickly. The precise positioning properties of the connector components 27 used herein make it possible for a support structure 1 composed in this way to be assembled very precisely over the entire length thereof, it typically being possible for deviations from a target geometry to be of less than a few millimeters, often even less than a few tenths of millimeters.

In the following, some possible embodiments of the support structure 1 proposed herein will be briefly explained, it being clear to a person skilled in the art that the framework 3 and further components of the support structure 1 or of the overall passenger transport system to be mounted thereon can additionally or alternatively also be designed in another manner.

Frames 71 may be formed on the vertical supports 15, by means of which frames, for example, rails of the passenger transport system can be fastened to the support structure 1. In this case, the frames 71 may be formed by an appropriate geometric design of a metal sheet cut to shape for this purpose. Since the entire support structure 1 can be manufactured in a highly precise manner, i.e., having at most very small deviations from a target geometry, and the frames 71 can also be cut very precisely, rails to be fastened thereto can extend very precisely in a target geometry and do not need to be aligned during installation thereof or retrospectively, as is often the case in conventionally manufactured support structures 1.

In this case, the vertical supports 15 may be composed of two sub-components 31 in the form of metal sheets appropriately cut to shape. The two sub-components 31 may be provisionally connected to each other by means of an insertion connection 32 for example, in order to be able to easily handle the vertical support 15 as a unit during an installation process, for example. Alternatively or additionally, local welded joints can connect the two sub-components 31 to each other. However, in this case neither the insertion connection 32 nor any possible welded joints need to be stable under load-bearing conditions, but instead all the sub-components 31 are intended to be fastened to each other only temporarily during an installation process, provided that the two sub-components 31 are later also connected to each other by connector components 27 in a load-bearing manner. Of course, the insertion connections and/or the welded joints between the sub-components can also be designed to be load-bearing to the extent that the sub-components 31 are reliably connected to each other and therefore do not need to both be connected to each other by connector components 27.

Further fastening regions, for example, for balustrade parts and/or paneling parts can be provided on the vertical supports 15.

Rail blocks for the passenger transport system can also be manufactured from fitted components and matched to the vertical supports 15 in the deflection regions thereof.

The angled vertical supports 25 at the transition points between the central region 17 and the top or bottom end region 19, 21 of the framework 3 substantially determine an angle of inclination of the escalator ultimately fitted.

The vertical supports 15 can comprise a flange having two surfaces that are arranged at right angles to each other and that, in an installed state, can be connected to two surfaces of rectangular tubes of the top or bottom chord 7, 9. Reinforcing angle elements can further be provided on the rectangular tubes.

Of course, it is not necessary for the entire support structure 1 to be constructed in the manner of a framework. The end regions 19, 21, step-on regions or deflection heads of the passenger transport system, shown in FIG. 1, can also be cast from fiber-reinforced cement, for example. Cast end regions 19, 21 of this kind can comprise runways for the rollers of a step band or pallet band, as well as receiving points for bearings and drive parts, which runways and receiving points consist of the cement material. Furthermore, the end regions 19, 21 cast from cement must also comprise attachment points such that a central region 17, constructed using connector components 27, top chords 7, bottom chords 9, vertical supports 15, cross members 11 and diagonal members 13, can be inserted between the two cast end regions 19, 21.

In order to manufacture a support structure 1 described above, a plurality of individual framework components 5 having suitable connection openings 39 formed therein can first be provided. For this purpose, for example, a plurality of structurally identical vertical supports 15, cross members 11 and/or diagonal members 13 can be mass-produced in advance and equipped with connection openings 39 matched to hole-filling connector components. For this purpose, in a vertical support 15, for example, two sheet metal parts that are to be fitted together can be provisionally connected to each other in advance, in that they are connected using insertion connections, for example, which connections are locally non-releasably secured to each other by spot welds or crimp-like deformations. In this case, the vertical supports 15 comprise connection openings 39 arranged at both ends, which openings can be arranged precisely relative to each other and so as to specify a parallel spacing between the top chord 7 and the bottom chord 9. At least one of the sheet metal parts of a vertical support 15 can comprise receptacles for fastening rails, the receptacles being precisely arranged relative to the connection openings 39 for the connector components 27. The connection openings 39 to be formed in the cross or diagonal members 11, 13 are also in each case arranged at opposing ends of said members so as to be precisely spaced relative to each other.

While the cross and diagonal members 11, 13 and the vertical supports 15 can preferably be pre-fabricated as mass-produced standard components and used for a very wide range of layouts of passenger transport systems, the top chords 7 and bottom chords 9 generally have to be produced to order. In this case, positions of connection openings 39 to be provided therein must be precisely calculated and formed in the top and bottom chords, taking account of an individual framework geometry that is to be ultimately achieved. In the process, a height of the vertical support 15 and a spacing of connection openings 39 in the diagonal member 13 must also be taken into account.

In order to assemble the framework 3 of the support structure 1, it may be advantageous to first pre-install a plurality of H-frames 69 by connecting two vertical supports 15 to at least one cross member 11 in each case, using the hole-filling connector components 27 described herein. H-frames 69 of this kind can also be easily handled by one person alone. The H-frames 69 can then be precisely connected to the top chords 7 and the bottom chords 9 by the connector components 27. Subsequently, the diagonal members 13 can be inserted and in turn connected by connector components 27 to the already pre-fabricated remainder of the framework structure. Finally, angled vertical supports 25, which are preferably mass-produced so as to be structurally identical and consist of at least two sheet metal parts that are fitted together and non-releasably secured, for example, by insertion connections by means of spot welds or deformations, can be attached to the framework 3. In this case, at least one of the sheet metal parts can comprise receptacles for fastening rails, and can comprise connection openings 39, precisely aligned using connector components 27, for fastening said rails.

A particular advantage of the support structure 1 described herein can be considered to be that said structure can be used particularly easily, also for installing passenger transport systems in existing constructions, using an installation method that takes advantage of the special properties of said support structure. For example, it may sometimes be necessary to replace existing passenger transport systems in a construction or to additionally retrofit a construction with passenger transport systems.

Conventional support structures for passenger transport systems which must be pre-fabricated completely or in large modules at a production site can be transported to the construction in which the passenger transport system is to be fitted and placed in an interior of said construction only with great outlay. For example, it has often been necessary up to now to use a semi-truck to transport a support structure, which is not very heavy but is very bulky, from a production site to a destination construction. It may then be necessary, at the destination construction, to remove existing walls in part, for example, in order to create a path through which the bulky support structure can be brought into the interior of the construction and to the destination for the passenger transport system. This was all associated with significant planning and logistical outlay and therefore with significant costs.

In contrast, in the case of the support structure described herein, it is possible to assemble said structure directly in the interior of a construction, using a specially adapted, simplified installation method. For this purpose, firstly a plurality of individual framework components 5, having the connection openings 39 already previously formed therein, can be placed at an installation position within the construction. If a passenger transport system is being replaced, the existing passenger transport system can optionally be removed, on-site, in advance. Furthermore, at least two bearing points for receiving the passenger transport system can be prepared in the construction. If necessary, a temporary scaffold can also be erected between bearing points of this kind.

The framework 3, dismantled into individual parts, can then be assembled, using the framework components 5 thereof, directly within the construction. In this case, the individual framework components 5, which are in part provided as structurally identical standard components, can be connected to each other as described, using the load-bearing and positioning connector components 27, and thus form the very precisely aligned framework 3. The framework 3 assembled in this way can finally be installed in prepared installation locations of the construction, within the construction.

Finally, some possible advantages of the support structure 1 described herein and/or of the method for the production thereof or for the installation thereof in a construction will be explained.

The framework for the proposed support structure 1 can be able to be constructed significantly more cost effectively than a framework that is welded throughout, for example. Said framework can in particular be assembled on-site, without installation training and in an extremely short time, for example, within a few hours or a few days. In this case, the only tool required is, for example, riveting pliers that are accordingly suitable for installing the connector components 39. In order to assemble the framework 3, advantageously no certified workers, such as certified welders, are required. Furthermore, subsequent alignment of the framework can generally be omitted. Components of the framework, in particular the framework components 5 thereof, can for example, be painted or in particular galvanized, prior to assembly thereof. A transport volume of the initially dismantled framework 3 can be extremely small.

The individual framework components 5 can, for example, be introduced into an interior of a construction through existing openings without problem, and without walls of the construction needing to be knocked down, for example. Dirt and noise emissions at the installation site can also be minimized on account of the clean and precise connection technology to be used, using the special connector components 27, since, for example, cleaning, separating and grinding work as well as welding work on cleaned out frameworks for example, as otherwise often arise in modernization solutions, are not required. It can further be considered advantageous that a higher local manufacturing proportion can be achieved by the possibility of being able to construct the framework 3 at the installation site. This can be a decisive sales factor, in particular in public sector orders. It can further be advantageous that just a few components, such as the top and bottom chords 7, 9 of the framework 3 need to be manufactured to order, whereas a plurality of other framework components 5 such as the cross members 11, diagonal members 13 and vertical supports 15 can be made available as standardized, mass-produced components. This can significantly simplify the entire logistics for producing and installing passenger transport systems. The described high precision achievable for the assembled framework 3 described herein can in addition be decisively advantageous in that, unlike in modernization solutions, rail fastenings (frames) do not need to be inserted (welded or screwed) into the welded framework in an aligned manner, but instead the frames can be formed directly on the vertical supports 15, for example.

Finally, it should be noted that terms such as "comprising" and the like do not preclude other elements or steps, and terms such as "a" or "one" do not preclude a plurality. Furthermore, it should be noted that features or steps that have been described with reference to one of the above embodiments may also be used in combination with other features or steps of other embodiments described above. Reference signs in the claims are not to be interpreted as being limiting.

The invention claimed is:

1. A method for installing a support structure for a passenger transport system, designed as an escalator or a moving sidewalk, in a construction, the support structure comprising a framework made of load-bearing framework components connected to each other, including top chords, bottom chords, cross members, diagonal members and vertical supports, wherein the method comprises:

placing a plurality of individual framework components, having connection openings formed therein, at an installation position within the construction, assembling the framework on or near the installation position within the construction by connecting the framework components to each other with load-bearing connector components, in that a respective connector component is arranged to reach through adjacently arranged connection openings of at least two adjacent framework components and is then deformed in respect of the outside geometry thereof, wherein the connector components are designed and are deformed upon connecting framework components such that they completely fill out the connection openings they reach through, without play, after connection of the framework components, and the framework components connect to each other in an interlocking manner in all spatial directions and position the framework components relative to each other when connecting the framework components, installing the assembled framework in prepared installation locations of the construction, within the construction, wherein, during assembly of the framework, the framework components are connected to each other in the following sequence:

pre-installing an H-frame by connecting two vertical supports to at least one cross member with the connector components;

connecting the installed H-frame to the top chords and the bottom chords, using the connector components;

inserting and connecting the diagonal member using the connector components.

2. The method according to claim 1, wherein the connector components are designed in such a way and the outside geometry thereof is deformed in such a way during connection of the framework components that, upon connecting the framework components, said connector components can be widened, at a lateral surface that reaches through the connection openings, such that they completely fill out the connection openings without play, and the widened lateral surface exerts a radially outwardly acting pressure on the inner edges of the connection openings.

3. The method according to claim 1, wherein the connector components are rivets.

4. The method according to claim 1, wherein the connector components are designed and are deformed in respect of the outside geometry thereof such that, upon connecting the framework components, said connector components completely fill out the connection openings they reach through, without play, such that they position the connection openings relative to each other so as to have a tolerance of less than 0.3 mm.

5. The method according to claim 1, wherein all the cross members, diagonal members and vertical supports of the framework are mass-produced so as to be identical in design.

6. The method according to claim 1, wherein the cross members, diagonal members and vertical supports are produced as metal sheets.

7. The method according to claim 1, wherein the top chord and bottom chord are designed and produced to order.

8. The method according to claim 1, wherein the top chord and bottom chord comprise rectangular tubes.

9. The method according to claim 1, wherein individual framework components are composed of a plurality of sub-components.

10. The method according to claim 9, wherein the sub-components of framework components are connected to each other using a non-load-bearing welded joint or crimped connection before connection of the framework components.

11. The method according to claim 1, wherein the framework components and/or sub-components of framework components are connected to each other using a non-load-bearing insertion connection before the framework components are connected by the connector components.

12. The method according to claim 1, wherein at least one of the top chord and the bottom chord comprise a plurality of sub-segments, each sub-segment comprising connection openings and the sub-segments being connected by the connector components.

13. The method according to claim 12, wherein the sub-segments are connected to each other on or near the installation position within the construction.

14. The method according to claim 1, wherein at least one element from a group comprising a rail block, flange parts of a drive space and flange parts of a tension station is additionally incorporated into the passenger transport system by connection to framework components of the framework by the connector components.

15. The method according to claim 1, wherein the connector components are high-strength blind clinch bolts.

16. The method according to claim 1, wherein the connector components are designed having a sleeve and at least one taper that is received in the sleeve and can be displaced relative to the sleeve.

* * * * *